United States Patent
Manning et al.

(10) Patent No.: US 8,127,008 B2
(45) Date of Patent: Feb. 28, 2012

(54) METHOD AND APPARATUS FOR MANAGING PROXY AND NON-PROXY REQUESTS IN TELECOMMUNICATIONS NETWORK

(75) Inventors: Michael Manning, Reading (GB); Chen Yehezkel Burshan, Tel-Aviv (IL); Nathan John Sowatskey, Madrid (ES); Ritesh Kumar, Richardson, TX (US); Gregory John Wilkins, Balmain (AU)

(73) Assignee: Cisco Technology, Inc., San Jose, CA (US)

( * ) Notice: Subject to any disclaimer, the term of this patent is extended or adjusted under 35 U.S.C. 154(b) by 1261 days.

(21) Appl. No.: 11/110,340

(22) Filed: Apr. 19, 2005

(65) Prior Publication Data

US 2006/0056317 A1     Mar. 16, 2006

(51) Int. Cl.
    *G06F 15/173* (2006.01)
(52) U.S. Cl. ............... 709/225; 709/219; 726/4; 726/12
(58) Field of Classification Search ............. 709/219, 709/225
    See application file for complete search history.

(56) References Cited

U.S. PATENT DOCUMENTS

| | | | |
|---|---|---|---|
| 5,805,803 A * | 9/1998 | Birrell et al. ............... | 726/12 |
| 5,987,611 A * | 11/1999 | Freund ........................ | 726/4 |
| 6,088,738 A | 7/2000 | Okada | |
| 6,636,894 B1* | 10/2003 | Short et al. .................. | 709/225 |
| 6,684,250 B2 | 1/2004 | Anderson et al. | |
| 6,757,518 B2 | 6/2004 | Spratt et al. | |
| 6,772,214 B1 | 8/2004 | McClain et al. | |
| 6,816,460 B1 | 11/2004 | Ahmed et al. | |
| 7,006,453 B1 | 2/2006 | Ahmed et al. | |
| 7,013,149 B2 | 3/2006 | Vetro et al. | |
| 7,096,491 B2 | 8/2006 | Cheng | |
| 7,171,460 B2 | 1/2007 | Kalavade et al. | |
| 7,324,469 B2 | 1/2008 | Wilson | |
| 2002/0103760 A1 | 8/2002 | Tianen et al. | |
| 2002/0164952 A1 | 11/2002 | Singhal et al. | |
| 2002/0167919 A1 | 11/2002 | Marples et al. | |
| 2002/0188562 A1 | 12/2002 | Igarashi et al. | |
| 2003/0028532 A1 | 2/2003 | Dougu et al. | |
| 2004/0054598 A1 | 3/2004 | Kall et al. | |
| 2004/0059802 A1 | 3/2004 | Jacquemot et al. | |

(Continued)

OTHER PUBLICATIONS

U.S. Appl. No. 10/944,484, filed Sep. 16, 2004, Office Action, Mailing date Dec. 20, 2010.

(Continued)

*Primary Examiner* — Yves Dalencourt
(74) *Attorney, Agent, or Firm* — Hickman Palermo Truong & Becker LLP

(57) ABSTRACT

A method is disclosed for determining a location of a client session in a telecommunications network by comparing attributes of the client session connection to location definition information stored in a configuration file. A method of handling requests from proxy and non-proxy client connections in a telecommunications network by redirecting requests from unauthenticated proxy clients to a transparent proxy port on a captive portal such that the captive portal proxies the requests is also disclosed. The request may be directed to a service, such as a destination IP address and optional port number. A method for a proxy server to identify an edge session through an out-of-band request containing proxy metadata to a web portal for secure (HTTPS) requests is also disclosed. The edge session is identified for the web portal through a hostkey determined by the proxy server.

17 Claims, 9 Drawing Sheets

U.S. PATENT DOCUMENTS

| | | |
|---|---|---|
| 2004/0139204 A1 | 7/2004 | Ergezinger et al. |
| 2004/0196806 A1 | 10/2004 | Loeffler et al. |
| 2004/0210640 A1 | 10/2004 | Chadwick et al. |
| 2004/0214576 A1* | 10/2004 | Myers et al. ............ 455/445 |
| 2005/0026596 A1 | 2/2005 | Markovitz |
| 2005/0055578 A1 | 3/2005 | Wright et al. |
| 2005/0097320 A1 | 5/2005 | Golan et al. |
| 2005/0114680 A1 | 5/2005 | Chinnaswamy et al. |
| 2005/0177515 A1 | 8/2005 | Kalavade et al. |
| 2005/0261970 A1 | 11/2005 | Vucina et al. |
| 2005/0286421 A1 | 12/2005 | Janacek |
| 2006/0031407 A1* | 2/2006 | Dispensa et al. ............ 709/219 |
| 2008/0109331 A1 | 5/2008 | Stadelmann et al. |
| 2011/0314149 A1 | 12/2011 | Manning |

OTHER PUBLICATIONS

U.S. Appl. No. 11/205,538, filed Aug. 16, 2005, Office Action, Mailing date Dec. 20, 2010.

* cited by examiner

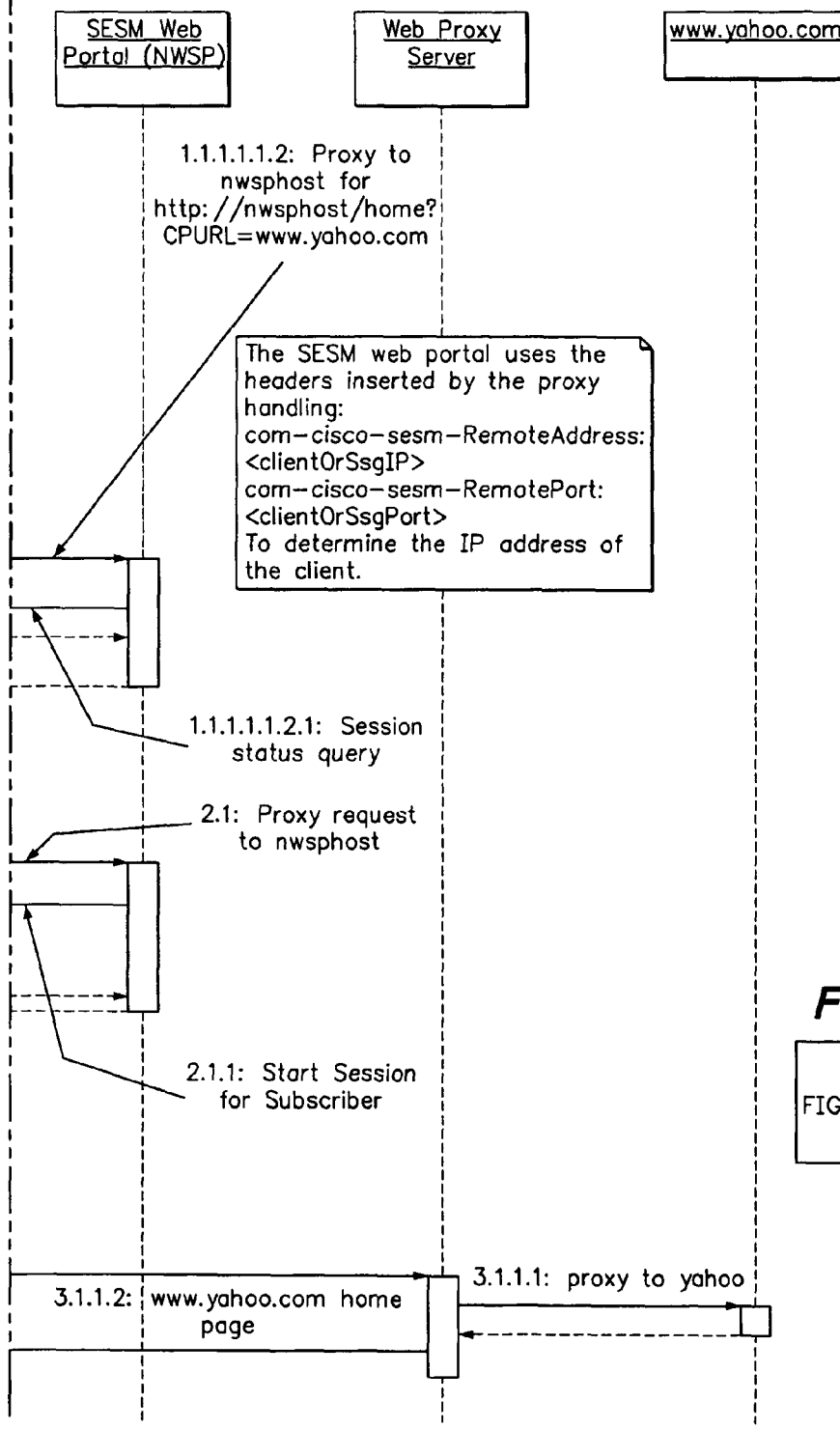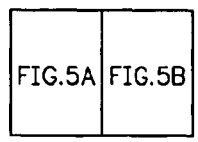

METHOD AND APPARATUS FOR MANAGING PROXY AND NON-PROXY REQUESTS IN TELECOMMUNICATIONS NETWORK

CROSS-REFERENCE TO RELATED APPLICATIONS; PRIORITY CLAIM

This application claims domestic priority under 35 U.S.C. §120 from prior application Ser. No. 10/944,484, filed Sep. 16, 2004, the entire contents of which are hereby incorporated by reference as if fully set forth herein.

FIELD OF THE INVENTION

The present invention generally relates to providing a set of Internet destinations or services that are "free of charge" to a user of a wireless network hotspot. The invention relates more specifically to a method and system for determining the location from which a user attempts to connect to the network and using the location to select a white list of hosts that the user can connect to before authentication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Public Wireless Local Area Networks (PwLAN) enable mobile computer users using a laptop or portable computing device to access information through continuous high-speed communications. PwLAN "hotspots" are the public locations where wireless Internet access can be obtained. Hotspots are typically located in such public areas as coffee shops, hotel lobbies or airport lounges.

PwLAN hotspots are capable of applying different behaviors to user sessions, depending on where the user connects to the network. This "location awareness" feature allows for the presentation of location-specific or branded retail pages or different elements within a page based on the user's connection attributes.

Although network access through a PwLAN hotspot typically requires a user to authenticate before access is allowed, a hotspot may allow the user to access certain designated free services before requiring the user to authenticate. When access to an Internet destination does not require identification and/or authentication of the user, the destination is considered to be "free of charge." Two mechanisms used to determine when a destination is "free of charge", and therefore accessible by an unauthenticated user, are "Open Gardens" and "White Lists." An "Open Garden" refers to a collection of domains that a user can access without providing authentication information. A "White List" is a set of specific Internet destinations that are accessible by an unauthorized user. The primary difference between Open Gardens and White Lists is the level at which accessible destinations are defined. Open Gardens allow or deny access to routing domains, while White Lists do not require a physical address and can define specific accessible destinations by URL (Uniform Resource Locator). Closely related to a White List is a "Black List." When a Black List is used to control access to specific destinations, the user is allowed access to all destinations that are not in the Black List.

White Lists, Black Lists and Open Gardens are typically implemented at the gateway through which the PwLAN hotspot connects to the network. As many hotspots can connect to the network through the same gateway, in these implementations the Open Garden or White List at the gateway applies to all users that connect through a gateway, no matter which hotspot they are using to access the network.

It would be advantageous to be able to configure a White List service such that different White Lists could be applied to different users. In particular, it would be advantageous to apply a location-awareness feature similar to the branding feature to a White List service such that different white lists can be configured for each hotspot from a centrally managed location.

Known implementations of location-aware branding are based on the ability to derive the connection attributes of the user's subnet based on the user's source IP or gateway through which the user connects, and present branded pages or different elements within a page based on those attributes. However, the ability to have a "location-based white list service" is more complex than merely providing a branded user web-based experience, as White Lists may be used before a user is authenticated, and therefore the known methods of implementing location awareness that rely on a user name or other authentication information cannot be used to implement a location-based white list service.

The concept of "location" can be more complex than a simple client IP address. A finer resolution of location, such as a particular access point or even switch access-port through which the user gains access, is desirable. Furthermore, location is often a hierarchical concept. For example, the United Kingdom, Heathrow, Terminal 1, and a specific airline first-class lounge can all be considered to be "locations". It is desirable to allow for different customizations at different location levels.

In addition to location, it is desirable to use any attribute of the user and/or the user's session to dynamically define a list of free services for the user in a particular session, such as authentication information, service level information, etc.

Furthermore, in addition to a White List service, it is desirable to apply location-awareness to other services, such as determining payment methods, setting Quality of Service parameters for a session, selecting an ISP, determining the rate at which to charge a user, determining how to perform authentication, or determining how to aggregate and distribute accounting information.

Based on the foregoing, there is a clear need for a method of dynamically defining available services for each user based on attributes of the user and/or the user's session. In particular, there is a need to dynamically define a White List for each user based on the location of the user when accessing the network, whether the user has been authenticated, and the services available to the user. Such a method should preferably be able to handle any type of request from a client browser without necessitating any configuration changes on the client (i.e. zero-configuration).

The method disclosed herein uses a granular approach for determining whether to allow access to destinations according to the location of a client session. The location is determined according to key characteristics or attributes of the client connection. In one embodiment of the disclosed method, a router redirects requests for access to a host to a Captive Portal Web Server which is capable of handling normal and proxy HTTP requests. The Captive Portal permits or denies access to hosts through configurable White and/or Black Lists. The lists can be default or location-specific, and can be used for other purposes in addition to providing a configurable White List service.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A and 5B are sequence diagrams that illustrate the system flow for an unauthenticated proxy user requesting a host not in a White List who then subsequently authenticates.

DETAILED DESCRIPTION

A method and apparatus for location-based white lists in a telecommunications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
   2.1 Gateway Redirection and Captive Portal Overview
   2.2 Web Proxy Overview
3.0 Method of Providing a Location-Based White List Service
   3.1 Mapping Connection Attributes to a List of Hosts
      3.1.1 Unauthenticated User
      3.1.2 Authenticated User
   3.2 Proxy and Non-Proxy Requests (Transparent Proxy)
   3.3 HTTP and HTTPS proxy requests
   3.4 Sequence Diagrams
   3.5 Partial Domain Names in White Lists
   3.6 White List Groups
4.0 Implementation Mechanisms—Hardware Overview
5.0 Extensions and Alternatives
1.0 General Overview The needs identified in the foregoing Background, and other needs and objects that will become apparent from the following description, are achieved in the present invention, which comprises, in one aspect, a method of determining whether access to a host requested by a user during a client session connection is permitted. Attributes of the user's client session connection are determined. A list of hosts is selected based on the determined attributes of the client session connection. The list of hosts can be a white list of permissible hosts, or a black list of impermissible hosts. The list of hosts is used to determine whether access to the requested host is permitted for this particular client session connection.

In other aspects, the invention encompasses a computer apparatus and a computer-readable medium configured to carry out the foregoing steps.

2.0 Structural and Functional Overview

Figure 1A:
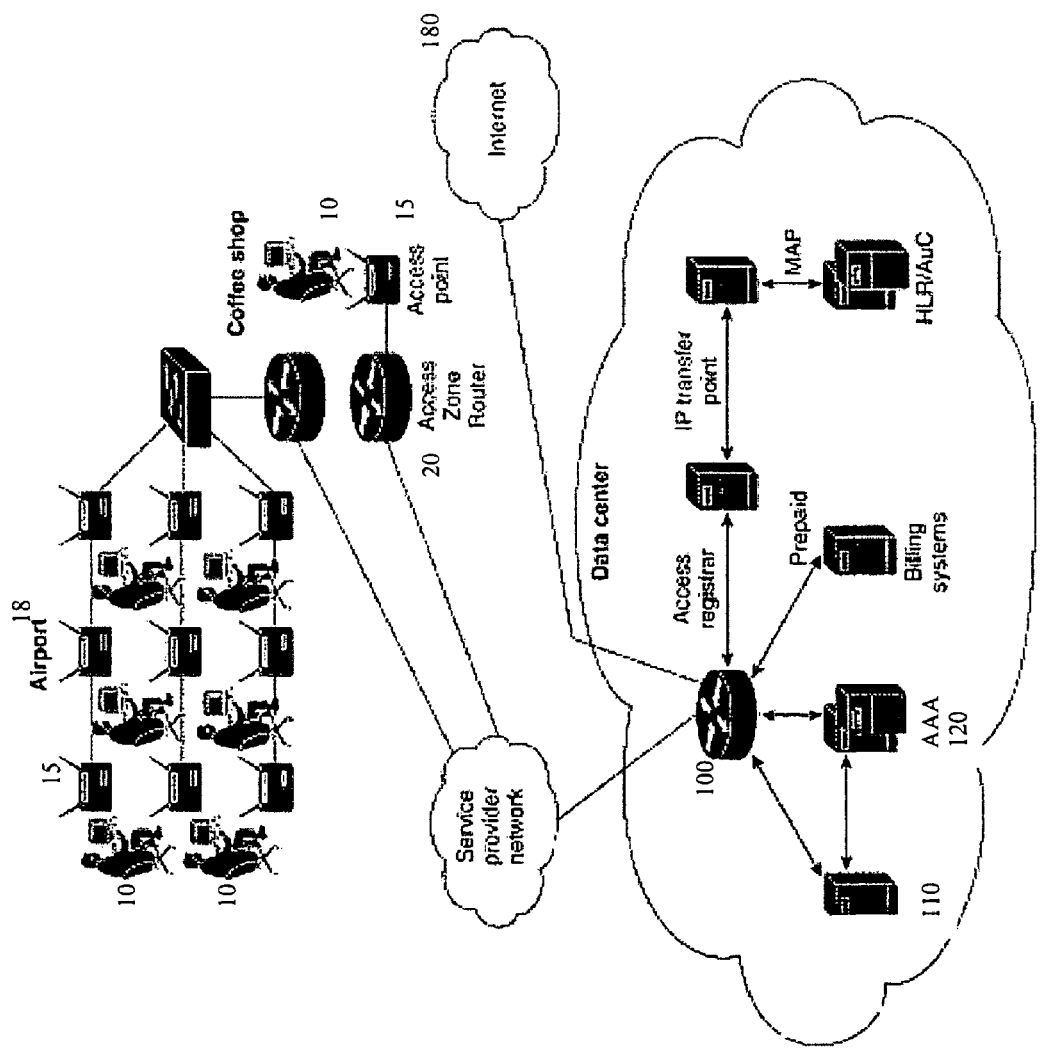
FIG. 1A is a block diagram that illustrates a high-level overview of the components of a PwLAN system implemented using a network management system.

FIG. 1A illustrates a network topology that may be used by a PwLAN operator to provide Internet services to users in a PwLAN hotspot. The components of the network topology of FIG. 1A will be used to describe the method of the present invention, however it will be apparent to those skilled in the art that the inventive method can be used with any type of network configuration, and not all of the components of FIG. 1A are required to implement the inventive method. Furthermore, although the present invention is described using a PwLAN hotspot as an example, it will be apparent to those skilled in the art that the inventive methods can be used in many different contexts, such as DSL (Digital Subscriber Line) access, for example.

In the example network of FIG. 1A, users 10 connect to Access Points (AP) 15 in an airport lounge or coffee hotspot 18. Within hotspot 18, APs 15 communicate with Access Zone Router (AZR) 20. The hotspot Internet Service Provider (ISP) routes network traffic from the WAN (Wide Area Network) interfaces of the AZRs, via a private network, for example, to an aggregation router 100.

In the example network topology shown in FIG. 1A, edge device 100 may be a router. In this example embodiment, router 100 acts as a gateway. One commercial example of such a router is a Cisco router running SSG (Service Selection Gateway). SSG is a software module typically embedded in Cisco IOS software that runs on Cisco devices, however, the functionality that is provided by the gateway (SSG) in the example configuration does not have to be embedded in the edge device. The gateway provides authentication, service connection, connection management and session management capabilities. In this example topology, the gateway performs authentication and service connection tasks on behalf of the network management system portal 110 through Authentication, Authorization and Accounting (AAA) server 120.

One commercial example of network management system 110 is Cisco's SESM (Subscriber Edge Services Manager). Network management system (SESM) 110 is a set of components designed to work in conjunction with the gateway. Network management system 110 comprises software for controlling access at the network edge and can bill users for using services in the data center. Network management system 110 may be deployed by ISPs and network access providers (NAPs) to provide value-added services to their subscribers and management capabilities to their administrators. Network management system 110 typically includes several web portals that interact with the edge device 100 acting as a gateway. These web portals are preferably J2EE (Java 2 Platform, Enterprise Edition) web applications that can run in a J2EE-compliant web application server.

2.1 Gateway Redirection and Captive Portal Overview

One web portal that is typically provided through the network management system is a "Captive Portal." Typically, when a user of a PwLAN hotspot who has not yet logged into the network attempts to access an Internet site through a hotspot access point, the user is redirected to this Captive Portal. The Captive Portal application looks at the user's request and determines if it is in a White List. If so, the user is allowed access to the requested host. Otherwise, the Captive Portal will redirect the user to a subscriber portal that provides the user with an opportunity to authenticate in order to access the network. The Captive Portal can be any server that is programmed to respond to a request from an unauthenticated user.

In a network configuration such as the one in the example topology shown in FIG. 1A, the ability to force subscribers to authenticate before accessing the network or specific services, and the ability to ensure that subscribers are only allowed to access the services that the service provider wants them to, may be implemented by redirecting unauthenticated or unauthorized users from the gateway to the Captive Portal. For example, if edge device 100 is a Cisco router running SSG, the TCP (Transmission Control Protocol) Redirect feature of SSG may be used in combination with a Captive Portal application of the network management system (SESM). The TCP Redirect feature intercepts TCP packets and reroutes the packets to server groups configured on the gateway. For packets which would otherwise be dropped, a server group on the gateway may be configured such that the packets are rerouted by the gateway to the Captive Portal.

Figure 1B:
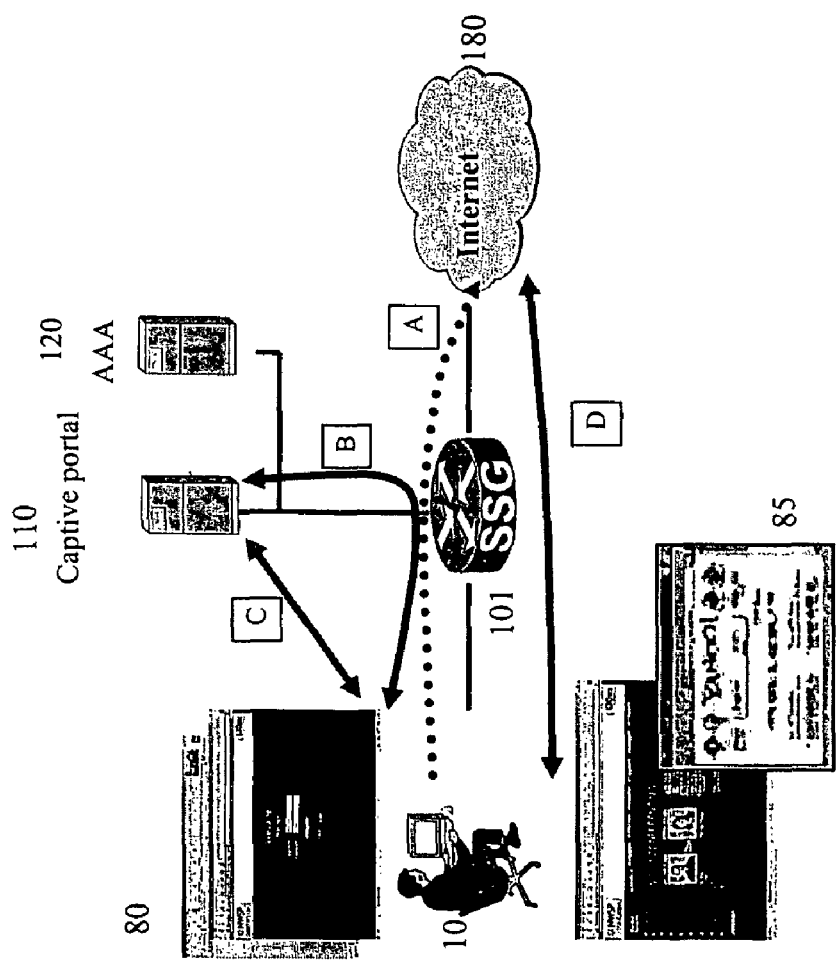
FIG. 1B is a block diagram illustrating a high-level overview of how a Captive Portal application can be used to redirect an access request from an unauthorized user to an authentication service in order to provide access to the requested service.

FIG. 1B illustrates how a user in the PwLAN of FIG. 1A who accesses the network and has not been authenticated is handled using TCP-Redirect and the Captive Portal application.

As shown in FIG. 1B, an unauthorized subscriber 10 associates with an Access Point and starts a standard browser. The user then enters a URL into the browser, such as "www.yahoo.com", for example. The browser resolves the DNS (Domain Name System) address and issues a HTTP (Hypertext Transfer Protocol) request, as shown by Arrow A. At Arrow B, the gateway redirects the HTTP packet to the Captive Portal application by changing the destination IP address and port in the TCP packets that constitute the request to the Captive Portal address and port. The IP address that the user is trying to connect to is also stored with the request as it is the IP address that the host name of the HTTP request will be resolved to by DNS.

As the network management system requires a user identifier to make further policy decisions, at arrow C the Captive Portal issues a HTTP redirect to a subscriber portal, such as Logon Page 80 on the Web Portal. The user logs in and is authenticated/authorized through the AAA (Authentication, Authorization and Accounting) server. A host object is created for this session, and at arrow D, the Captive Portal then causes the browser to be redirected to the originally requested URL (e.g. "www.yahoo.com") using HTTP redirect, or any other method known to those skilled in the art.

In a configuration such as the example shown in FIG. 1A, the Captive Portal application acts as a logical router or dispatcher for all of the different redirected requests coming from the gateway. The Captive Portal does not provide any content to subscribers. Its main purpose is to apply business logic that determines what will happen next.

In one embodiment, the Captive Portal application is a web application with multiple listeners for requests. Each listener in the Captive Portal is configured as a different port number. When the gateway modifies the IP address in the TCP packet to cause the redirection to a web server running the Captive Portal application (Arrow B in FIG. 1B), it also modifies an outgoing port value indicating a type for the TCP redirection. In this manner, the port number in a redirected request identifies the type of redirection to the Captive Portal application.

Types of redirection and destination ports are preferably configurable on the gateway. In one embodiment, server groups containing a list of servers are defined, each server group associated with a type of redirection.

A configuration file on the Captive Portal can be used to associate an incoming port number to a content application URL. The information in this configuration file specifies how requests on each incoming port number should be redirected. In one embodiment, the configuration file is a XML (eXtensible Markup Language) file, "captiveportal.xml", however the configuration information can be stored and managed using any method known to those skilled in the art.

The Captive Portal application then issues an HTTP redirect that redirects the user's browser to the content application URL associated with the port number in the request redirected by the gateway to the Captive Portal application. Like the original request redirected to the Captive Portal from the gateway, the request redirected by Captive Portal to the associated content application URL can include information from the original HTTP request, in the form of query parameters appended to the HTTP redirect URL. That is, all of the information in the user's original HTTP request is preserved throughout the redirections.

Significantly, the Captive Portal determines which content application URL should handle the request based on configuration attributes that associate incoming port numbers to content application URLs. Each type of redirection uses a different port value. The port number identifies the type of redirection to the Captive Portal.

In a preferred embodiment, the network management system may use the Java Management Extensions (JMX) specification and its related JMX MBean standards for application configuration. Managed beans are Java objects that represent a JMX manageable resource. MBeans for each network management system application are specified in configuration XML files. Administrators can change application configuration by changing MBean attribute values through a network management system application that presents a web-based view of managed resources and associated MBeans, or by manually editing associated configuration XML files. As will be apparent to those skilled in the art, use of JMX is not required, as there are many means of providing and managing configuration information that can be used. The configuration files that are used in one example implementation of the inventive method are described in more detail below.

Although the specific configuration of SSG/SESM is used herein to describe how unauthenticated users are handled in one PwLAN configuration, those skilled in the art will recognize that there are many ways to implement a Captive Portal, and the particular SSG/SESM configuration discussed above is not required in order to redirect host requests through a Captive Portal. Although the method of the present invention will be described using a SSG/SESM network configuration, the method of the present invention can be implemented in many different PwLAN configurations. In addition, it is not required that a wireless network be used to implement the disclosed method as the method of the present invention can also be used in any type of telecommunications network.

2.2 Proxy Server Overview

Clients accessing PwLANs may be using browsers that have a variety of different web proxy and related configuration settings. In addition, the OS (Operating System) connection settings of a client's computer may have a variety of DNS settings. Some of these settings will refer to hosts or IP addresses that are not normally resolvable or reachable in a given PwLAN. As a result, these users will not be able to operate properly in a PwLAN environment.

One example of this situation is a proxy client. Proxy clients use an intermediate preconfigured proxy service to access the Internet. A proxy client's browser may be configured to use a proxy server with an unresolvable name or an unreachable IP address. This may occur either because the user is not yet authenticated to access the network from the hotspot or because the browser is intended to be used within an intranet such as a corporate network. For these types of situations, the gateway can be configured to TCP redirect web requests from such users through a web proxy in the network management system.

Figure 1C:
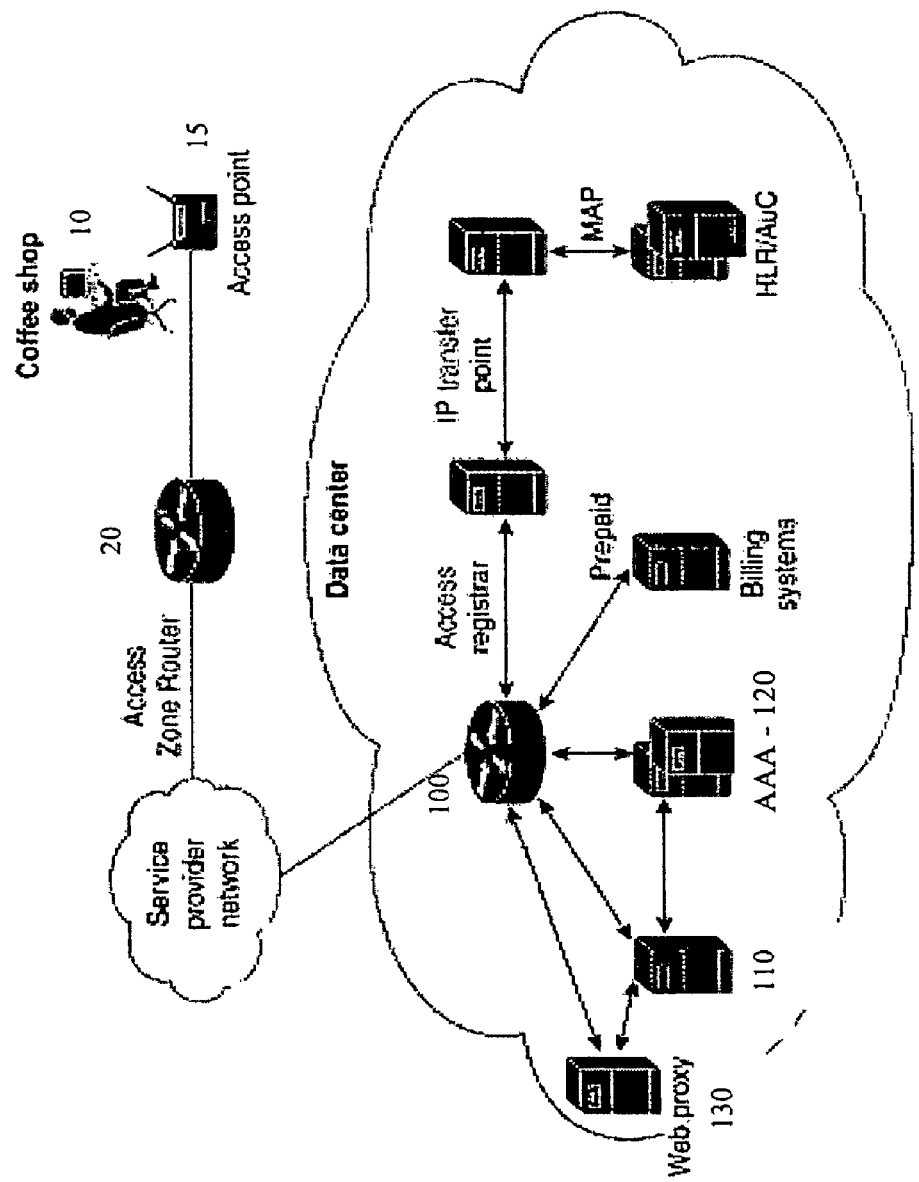
FIG. 1C is a block diagram that illustrates a high-level overview of the components of a PwLAN system implemented using a network management system that includes a Web proxy.

FIG. 1C illustrates the network components in one PwLAN configuration that uses a web proxy configuration. As in FIG. 1A, user 10 connects to AP 15 in a coffee shop hotspot. Within the hotspot, AP 15 communicates with AZR 20. The hotspot ISP routes network traffic to aggregation router 100. In one example of a commercial embodiment, Router 100 is running SSG.

Figure 1D:
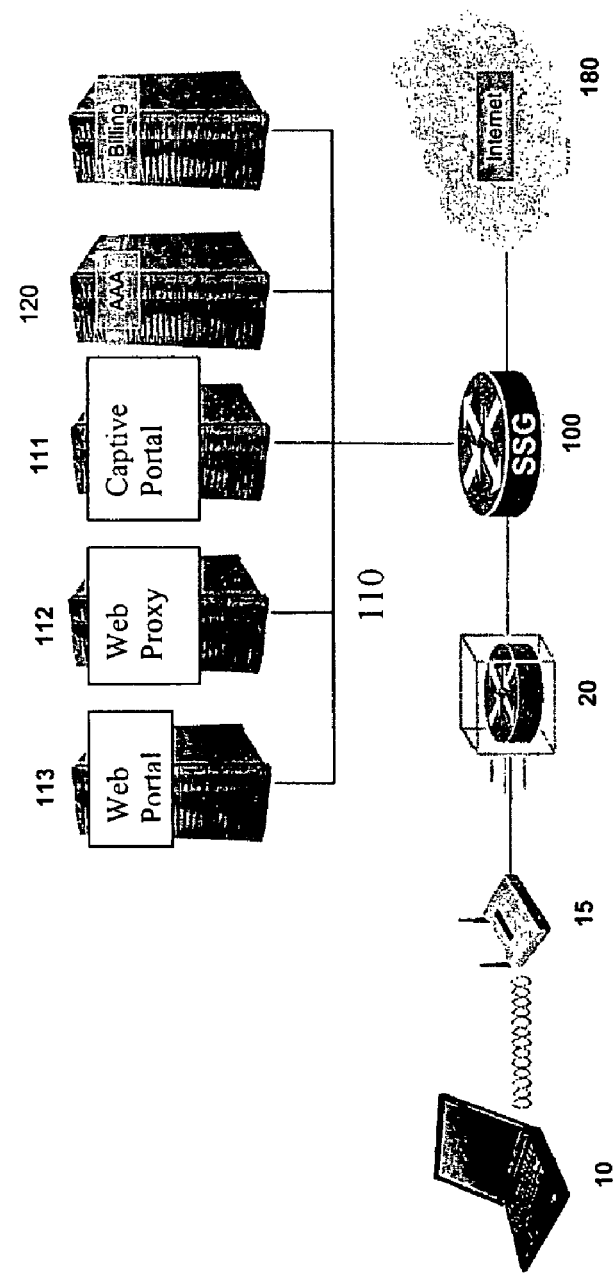
FIG. 1D is a block diagram that illustrates the components of a network management system as used by one embodiment of the disclosed method.

As shown by FIG. 1D, in this configuration, after user 10 associates with AP 15, the browser issues a request to the IP address of its configured web proxy server 130. Because the user is not yet authenticated, the gateway 100 performs a TCP redirect to the Captive Portal 111 of the network management system 110. Captive Portal 111 receives the request and determines that it is a proxy request. Captive Portal can then instruct the gateway to set permanent TCP redirection to the network management system Web proxy 112. In one embodiment, Web proxy 112 may be a logical function of Captive Portal 111. Through TCP permanent redirection, web proxy 112 will then act as a local proxy server. The Captive Portal then redirects the user to the network management system login web portal 113. In this way, after authentication by web portal 113, all future web requests from the user's session will be redirected to the network management system for handling.

Once the gateway is notified that the permanent TCP redirection for the user, all requests from this user will be redirected to local network management system Web proxy. In an alternative embodiment, a third-party server or gateway can be installed and configured as proxy server to permanently redirect requests to.

When this configuration is used for web proxy users, all pre-authentication requests will be handled by Captive Portal through TCP redirection by the gateway, and all post-authentication requests will be handled by the local network management system Web proxy. By having different configurations for these two cases, it is possible to achieve differentiated behavior in White List services. For example, post-authentication White Lists can include more or different hosts than the pre-authentication White Lists.

As will be discussed below, one embodiment of the method of the present invention is implemented using features of this configuration. A high-level overview of the method is discussed, followed by a description of an implementation of the inventive method in the example SSG/SESM web proxy configuration. However, as will be apparent to those skilled in the art, alternative implementations are possible, and are intended to come within the scope of the present invention.
3.0 Method of Providing a Location-Based White List Service In the present invention, instead of requiring unauthorized users to authenticate themselves before any network access is allowed, users are allowed to access Internet websites that are defined in a "White List." Alternatively, users may be allowed to access any Internet website that is not in a "Black List." Typically, Black Lists are used after authentication or authorization, however, a Black List could potentially be used pre-authentication. Likewise, White Lists are typically used before a user has been authenticated, however, White Lists could be implemented for authenticated users. In addition, a combination of White Lists and Black Lists can be used both pre and post-authentication. The White List/Black List feature allows for value-add for a Service Provider in the form of free services prior to authentication and control of access after authentication.

In the present invention, the system allows for mapping of key characteristics or attributes of the user's connection to resolve to a location. The location is then used to determine what the user can and cannot do, i.e. which destinations the user can access or which services the user can take advantage of. More specifically, key attributes of the connection are mapped to a location, and the location is used to look up the associated White List and/or Black List for that location.

Figure 2:
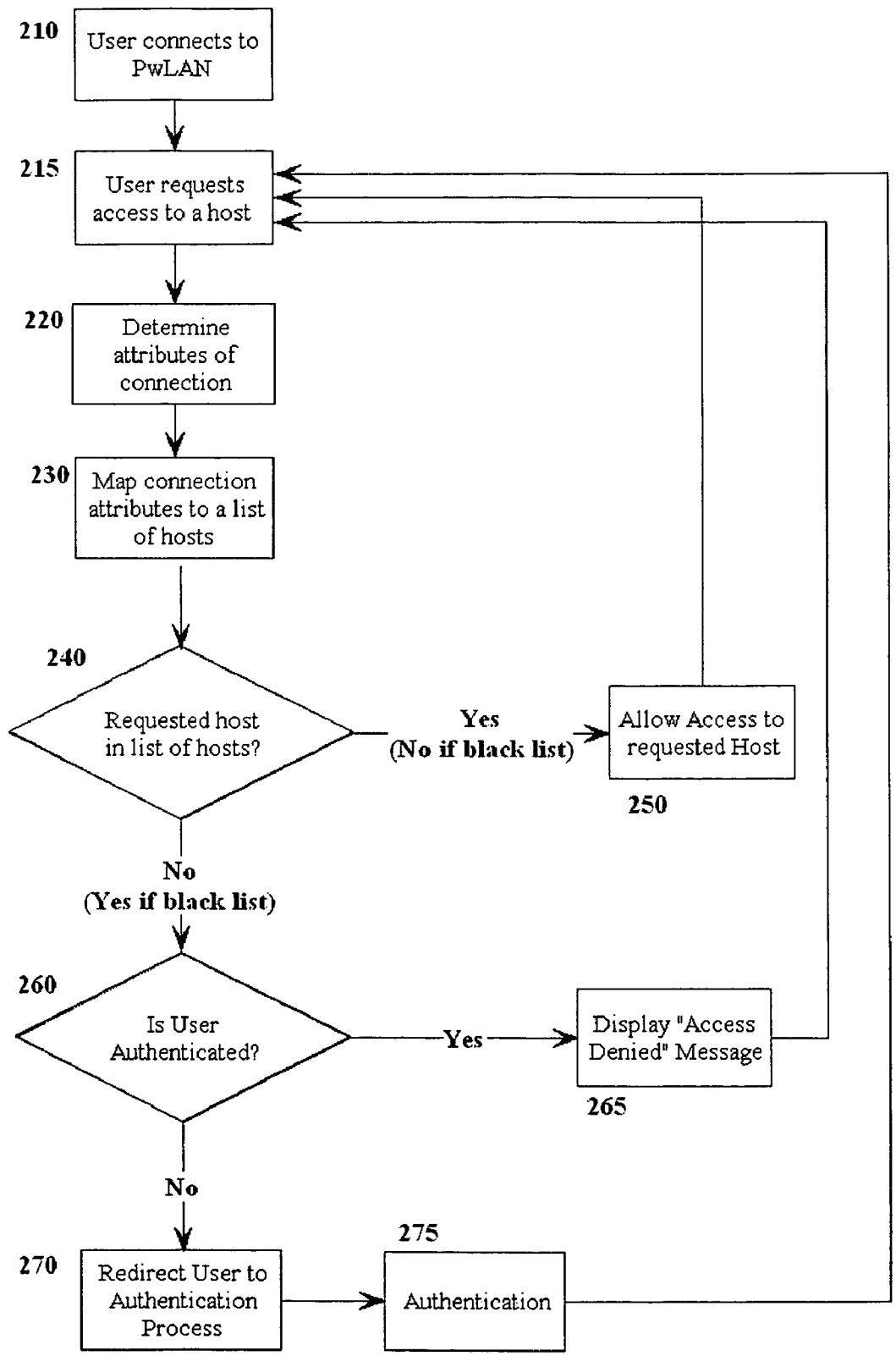
FIG. 2 is a flow diagram that illustrates a high level overview of one embodiment of a method for dynamically defining a White List.

FIG. 2 illustrates a high-level overview of one embodiment of a method of the present invention. As shown in steps 210 and 215, once the user has connected, such as for example to an access point in a PwLAN, access to a host is requested. For example, the user can initiate an Internet browser on his mobile device and type a URL (Uniform Resource Locator) in his browser address bar. Although the invention is described using the example of entering a URL into a browser, there are many different ways a user can request host access. For instance, a browser may be configured to startup to a home website, and a request to access the home website is automatically requested upon the user starting the browser.

In step 220, the attributes of the connection established in step 210 are examined in order to determine key attributes of the client connection. In one embodiment, a location of the client is determined from the connection attributes. However, any parameter or attribute derived from connection information can be used to select a White List, not just location parameters. For example, whether a user has been authenticated can be used when selecting a White List. As another example, the particular services that have been activated for a user can be used when selecting a White List. As another example, the type of client (e.g. Internet Explorer, Netscape, etc.) that the user is using can be used when selecting a White List. Any combination of these attributes can also be used together, as they are not mutually exclusive.

In an embodiment implemented using SSG/SESM, the connection attributes can be derived from the "Complete ID" of the client connection. "Complete ID" is a term used by Cisco Systems to describe information about an edge session. In an SSG/SESM network deployment, the SSG makes the Complete ID available to SESM through the RADIUS protocol. In particular, the Complete ID is sent from an SSG router to SESM in response to a query from SESM to SSG about the presence of a Host Object which represents a session.

A Complete ID can contain a number of key characteristics or attributes for a given connection, such as IP address, MAC (Media Access Control) address, VPI (Virtual Path Identifier) information, VCI (Virtual Channel Identifier), SSG sub-interface information, subnet information or MSISDN (Mobile Station International ISDN). The attributes in the Complete ID are valid and available at any time, even before the client/session has been authenticated. In addition, after the user has authenticated, the Complete ID may contain the user name used to authenticate the connection. A Complete ID can be used to identify a client, which can be a single user on a PC, a site managing many users, or a transit user at a PwLAN hot spot location.

In one embodiment, a location is determined from the attributes derived from the user's "Complete ID". There are many ways of using the information in a Complete ID to determine the location of the connection. For example, location can be defined for a subscriber IP address range, VPI range, or subinterface, or any combination thereof.

As will be apparent to those skilled in the art, other network configurations will have similar functions to obtain the type of information that is stored in a "Complete ID."

In addition, a "Complete ID" is not required to determine connection attributes. For example, in one alternative embodiment, a location for the connection session can be determined from configuration data that maps IP addresses (or subnets) to locations. As will be apparent to those skilled in the art, there are many alternative methods of determining attributes of a client connection. The scope of the present invention is intended to include any such alternative method, and not to be dependent on any particular network components or configuration.

Any parameter derived from connection information can be used to select a White List. For example, whether a user has been authenticated is an attribute that can be used to select a White List. As another example, the particular services that have been activated for a user can be determined from the connection information and used to select a White List. A combination of parameters, such as for example location and authentication information, can also be used to select a White List.

Once the connection attributes are determined, these attributes are used to select a White List for this connection, as shown by step 230. Location and/or other attributes of the user's connection are in effect used as a key to look up the White List.

At step 240, the host requested in step 215 is compared to the list of hosts selected in step 230. If the list is a White List and the requested host is in the list, then access is allowed to the requested host, as shown by step 250. Likewise, if the list of hosts is a Black List, and the requested host is not in the list, then access is allowed to the requested host at step 250.

The process is repeated for the next requested host at step 215.

If the host requested in step 215 is not in the White List selected in step 230 (or is in the Black List selected in step 230), then the user can be forced to authenticate, as shown by steps 270 and 275. If, however, the user has already been authenticated, then in this case the user is attempting to access an unauthorized host. An appropriate message is displayed to the user at step 265, and the entire process is repeated for the next requested host at step 215.

The method shown in FIG. 2 illustrates an embodiment in which the list of hosts is determined each time a user makes a request. In an alternative embodiment, a list of hosts may be determined for the first request, then cached. When the user makes a second request, the cached list may be consulted in order to determine if the second requested host is in the list of hosts. By caching the list, processing speed may be reduced. In this alternative embodiment, the list of hosts may be re-determined when the user authenticates, as the list may change for authenticated users.

The method of FIG. 2 or any alternative methods may be implemented in a number of different ways. When a SSG/SESM configuration is used, the TCP-Redirect feature of SSG and the SESM Captive Portal application may be used to implement the above process. While this implementation is described in more detail herein, alternative implementations will be apparent to those skilled in the art.

3.1 Mapping Connection Attributes to a List of Hosts

In one embodiment, the listener port of the Captive Portal is used to look up a specific White/Black List. A White/Black List can be specified for each listener port of the Captive Portal. Therefore, use of a listener port allows redirection-specific White Lists for unauthenticated user redirection, unauthorized service redirection, prepaid session redirection, prepaid service redirection, initial captivation and advertising captivation.

However, as will be apparent to those skilled in the art, alternative means of looking up a specific White/Black List are available, and it is not required that a listener port be used to perform this function.

In one embodiment, if a user is authenticated, this attribute is determined in step 220, and used to redirect the request to a specific port on Captive Portal. The specific port to redirect the request to is determined by how server groups are configured on the gateway. Each of the listener ports of Captive Portal used in this manner matches a port of a server defined in each of the server groups for which the connections are being redirected. The chosen server group is specified in the profile of the active service for the user. For example, this can be done through the Server-Info=KW<server-group> (RADIUS Vendor Specific) attribute.

Prior to authentication, location information is available for the connection session, and determined in step 220. Requests from users who have not yet been authenticated are redirected to a specific user port in Captive Portal designated for unauthenticated users. When the Captive Portal receives a request on this port, it can determine a location from the information passed with the request, and use the determined location to look up a specific White/Black List for that location. Alternatively, the Captive Portal may query for the Complete ID, or similar information, in order to determine location attributes.

In addition, global default White/Black Lists can be defined. Typically, a default White List will contain hosts used by the network management system. A host is permitted if it is present in the default or specific White List determined by the listener port.

In this embodiment, the lookup of White/Black Lists occurs with the following precedence:
(1) Listener Port
(2) Location
(3) Default By following this precedence order, in this embodiment White Lists are first specified according to the type of redirection. For example, authenticated users are redirected to specific ports that the Web Proxy is listening on. Only if no White List for the listener port in use is found will a White List specific to the user's location (or other connection attributes) be used. Only if no White List for the listener port is found and if a location cannot be determined will a default White List apply.

In alternative embodiments, a different precedence order may be used, and different features may be used to determine the precedence order. Any combination of features can be used to look up White Lists or Black Lists. For example, a system can be configured to retrieve location-specific White Lists and default White Lists or to retrieve Black Lists for listener ports (authenticated users).

3.1.1 Unauthenticated User

By default, when a user is not authenticated, requests are redirected to Captive Portal on port 8090. This port is configurable, however, and any port number can be used. Both the gateway and the Captive Portal are configured to use the same port for this type of redirection.

In the "captiveportal.xml" configuration file (or other configuration file) on the Captive Portal, a "Location" MBean can be used to define locations. As will be apparent to those skilled in the art, alternative methods of defining locations can be used, and are intended to come within the scope of the present invention.

Table 1 illustrates an example section of "captiveportal.xml" that configures a location "Heathrow" for the client subnet 10.0.0.0 to 10.10.0.0. This configuration is used by the Location MBean to determine if a connection session is from the Heathrow location.

TABLE 1

```
<Configure jmxname="com.cisco.sesm:name=Location">
   <Set name="locations">
      <Array class="com.cisco.sesm.core.location.Location">
         <Item>
            <New class="com.cisco.sesm.core.location.Location">
               <Set name="name">Heathrow</Set>
               <Set name="parameters">
                  <Array class=
                  "com.cisco.sesm.core.location.LocationParameter">
                     <Item>
                        <New class=
                        "com.cisco.sesm.core.location.IPRangeParam">
                           <Set name="start" type="String">10.0.0.0</Set>
                           <Set name="end" type="String">10.10.0.0</Set>
                        </New>
                     </Item>
                  </Array>
               </Set>
            </New>
         </Item>
```

If the client IP address is in the range defined as "Heathrow" in the Location MBean, then the location-specific white list for Heathrow will be selected and used to determine whether access to the requested host is allowed. Configuration file "captiveportal.xml" can also be used to map the value of the White List for a location defined in captiveportal.xml. Table 2 is an example of a section of the captiveportal.xml configuration file that could be used to map a White List to the Heathrow location defined in Table 1. Alternatively, this information could be in a separate configuration file, such as "web-jetty.xml." In this example, if the location is determined to be "Heathrow", then the White List consists of the URLs "www.Heathrow.com" and "www.yahoo.com."

TABLE 2

```
<Set name="proxyHostsWhiteLists">
   <New class="java.util.HashMap">
      <Put name="heathrow">
         <Array class="java.lang.String">
            <Item>www.Heathrow.com</Item>
            <Item>www.yahoo.com</Item>
         </Array>
      </Put>
   </New>
</Set>
....
```

As discussed above, if the connection attributes for an unauthorized user do not map to any defined location, a default list can be defined and used. Table 3 illustrates an example of a default list defined in "captiveportal.xml" or other configuration file. In this example, the default list includes SESM hosts, specific IP addresses as well as the URL "www.default.com."

TABLE 3

```
<Set name="proxyHostsWhiteLists">
   <New class="java.util.HashMap">
      <Put name="default">
         <Array class="java.lang.String">
            <Item>sesm</Item>
            <Item>localhost</Item>
            <Item>127.0.0.1</Item>
            <Item>www.default.com</Item>
         </Array>
      </Put>
   </New>
</Set>
...
```

3.1.2 Authenticated User

When a user has been authenticated, this can be determined from the connection attributes determined in step 220 in FIG. 2. In one embodiment, a specific White List defined by that user's ISP provider for authenticated users can be used instead of the location-based White List for unauthenticated users described above.

In one embodiment, authenticated but not authorized proxy users can be redirected to a specific network management system web proxy server. The same web proxy functionality applies to both the Captive Portal and web proxy. Therefore, either port-specific lists on the Captive Portal or web proxy servers with default lists can be used. For example, for a web proxy server with authenticated but unauthorized users, a Black List may contain domains A, B and C. When a user has been authorized for service A, the user may be redirected to a web proxy server with a Black List containing B and C. When a user has been authorized for service B, the user may be redirected to a web proxy server with a Black List containing A and C, and so forth.

As an example, consider an authenticated user with service IspA as auto-logon. In this example, the "captiveportal.xml" configuration file is configured such that port '8103' is defined as the redirection port for IspA. Likewise, the gateway is configured to redirect requests to port 8103 of the Captive Portal for authenticated IspA users.

In this example, the configuration file "captiveportal.xml" (or other configuration file) on Captive Portal is configured such that a White List is defined for port 8103. An example of this section of "captiveportal.xml" is shown in Table 4.

TABLE 4

```
<Set name="proxyHostsWhiteLists">
   <New class="java.util.Hashmap">
      <Put name="8103">
         <Array class="java.lang.String">
            <Item>www.IspA.com</Item>
         </Array>
      </Put>
   </New>
</Set>
...
```

When a request is redirected from the gateway to the Captive Portal using port 8103, "www.IspA.com" is the White List for this user authenticated by IspA.

Table 5 illustrates an example section of "captiveportal.xml" or other configuration file that combines the above concepts. The configuration in Table 5 provides mappings from locations "Heathrow" and "Gatwick" to specific White Lists. The configuration in Table 5 also provides mappings from specific listener ports to specific White Lists. This example configuration provides location-specific pre-authentication, port-based post-authentication and default White Lists at lines 3-12, 13-27, and 28-35, respectively.

TABLE 5

```
1   <Set name="proxyHostsWhiteLists">
2     <New class="java.util.HashMap">
3       <Put name="heathrow">
4         <Array class="java.lang.String">
5           <Item>www.Heathrow.com</Item>
6         </Array>
7       </Put>
8       <Put name="Gatwick">
9         <Array class="java.lang.String">
10          <Item>www.Gatwick.com</Item>
11        </Array>
12      </Put>
13      <Put name="8103">
14        <Array class="java.lang.String">
15          <Item>www.ispA.com</Item>
16        </Array>
17      </Put>
18      <Put name="8104">
19        <Array class="java.lang.String">
20          <Item>www.ispB.com</Item>
21        </Array>
22      </Put>
23      <Put name="8105">
24        <Array class="java.lang.String">
25          <Item>www.ispC.com</Item>
26        </Array>
27      </Put>
28      <Put name="default">
29        <Array class="java.lang.String">
30          <Item>sesm</Item>
31          <Item>localhost</Item>
32          <Item>127.0.0.1</Item>
33          <Item>www.default.com</Item>
34        </Array>
35      </Put>
36    </New>
37  </Set>
```

The client session attributes that map to locations "Heathrow" and "Gatwick" and defined in configuration file "captiveportal.xml", as discussed in connection to Table 1 above; listener-ports are defined for ISPs A, B and C as discussed in connection to Table 4 above.

In a preferred embodiment, a means to poll the xml configuration file for changes is provided so that when any configuration changes are made in the configuration file, the Captive Portal will read and apply the new configuration. For example, a timestamp of captiveportal.xml may be used to determine that the configuration has changed, and that captiveportal.xml needs to be re-parsed in order to apply the latest configuration changes.

3.2 Proxy and Non-Proxy Requests

The implementation described above assumes that the requests are all HTTP proxy requests. An HTTP proxy request occurs when a user's browser has been configured to use a proxy server. The need to handle proxy requests typically arises because the proxy server given in the browser's configuration may be unreachable or have a name that is unresolvable. Typically, these situations occur when a user is not yet authenticated to access the network from the hotspot and the browser is intended to be used within an intranet such as a corporate network. This may also occur when a laptop is configured with static domain names or IP addresses for DNS, DHCP and web proxies.

In the embodiment described above, all HTTP proxy requests are redirected to the Captive Portal by the gateway using TCP-Redirect. Therefore, Captive Portal can determine White Lists as part of servicing the proxy request. However, non-proxy requests are not automatically redirected to the Captive Portal. The example below describes an alternative implementation that handles non-proxy as well as proxy requests.

In this alternative implementation, all web requests are redirected through the Captive Portal whether the client has a web proxy configured or not. In order to redirect all requests, including requests from non-proxy clients, to the Captive Portal, a "transparent proxy" may be used. Transparent proxies intercept all web requests and redirect them to the web proxy. Transparent proxies, such as "Squid", are known to those skilled in the art, and will not be discussed in detail. Any implementation of a transparent proxy can be used to redirect non-proxy requests to the Captive Portal.

In one embodiment, Captive Portal listener ports where transparent proxying will occur for non-proxy users may be configured for both unauthenticated user redirection and default unauthorized service redirection.

As will be apparent to those skilled in the art, alternative means of handling proxy and non-proxy requests are available, and can be used when implementing the inventive method.

3.3 HTTP and HTTPS Proxy Requests

In one embodiment, HTTP and HTTPS proxy requests may require special handling as the network management system typically requires a host key based on source IP and source port in order to identify the edge session. This needed client information may be conveyed via the Proxy Server in one embodiment.

When a request is proxied by the proxy server to the Web Portal, the host key information is not directly available to the Web Portal. In one example embodiment, this information is inserted into the headers of requests proxied by the Proxy Server to the Web Portal.

For HTTP requests, the required information may be directly included in HTTP headers sent with the proxied request. For example, the headers 'com-cisco-sesm-RemoteAddress' and 'com-cisco-sesm-RemotePort' may be used to pass the source IP address and source port in the proxied request.

However, it is not possible to modify an HTTPS request due to the confidential and integral nature of SSL. Therefore, since it is not possible to modify a HTTPS proxied request, in one embodiment, out-of-band signaling may be used to handle these requests. After the proxy server (Captive Portal or Web Proxy) has opened a HTTPS connection to the network management system Web Portal, but before the connection is used, the proxy server may make a new out-of-band request to an HTTP port on the network management system Web Portal. The request may contain the headers 'com-cisco-sesm-RemoteAddress' for the remote address, 'com-cisco-sesm-RemotePort' for the remote port, 'com-cisco-sesm-Proxy' for the address and port that the proxy server received the connection on, and 'com-cisco-sesm-ProxyConnection' for the source address and port of the real connection from the proxy server to the network management system Web Portal. This information may be collectively referred to as the "proxy meta-data." Using this proxy meta-data information the network management system Web Portal is then able to look up the hostkey using the remote address and port of the actual HTTPS connection, which is the same as what was passed in the 'com-cisco-sesm-ProxyConnection' header in the out-of-band request.

It will be apparent to those skilled in the art that other types of out-of-band requests may similarly be used in different network configurations.

3.4 Sequence Diagrams

Figure 3:
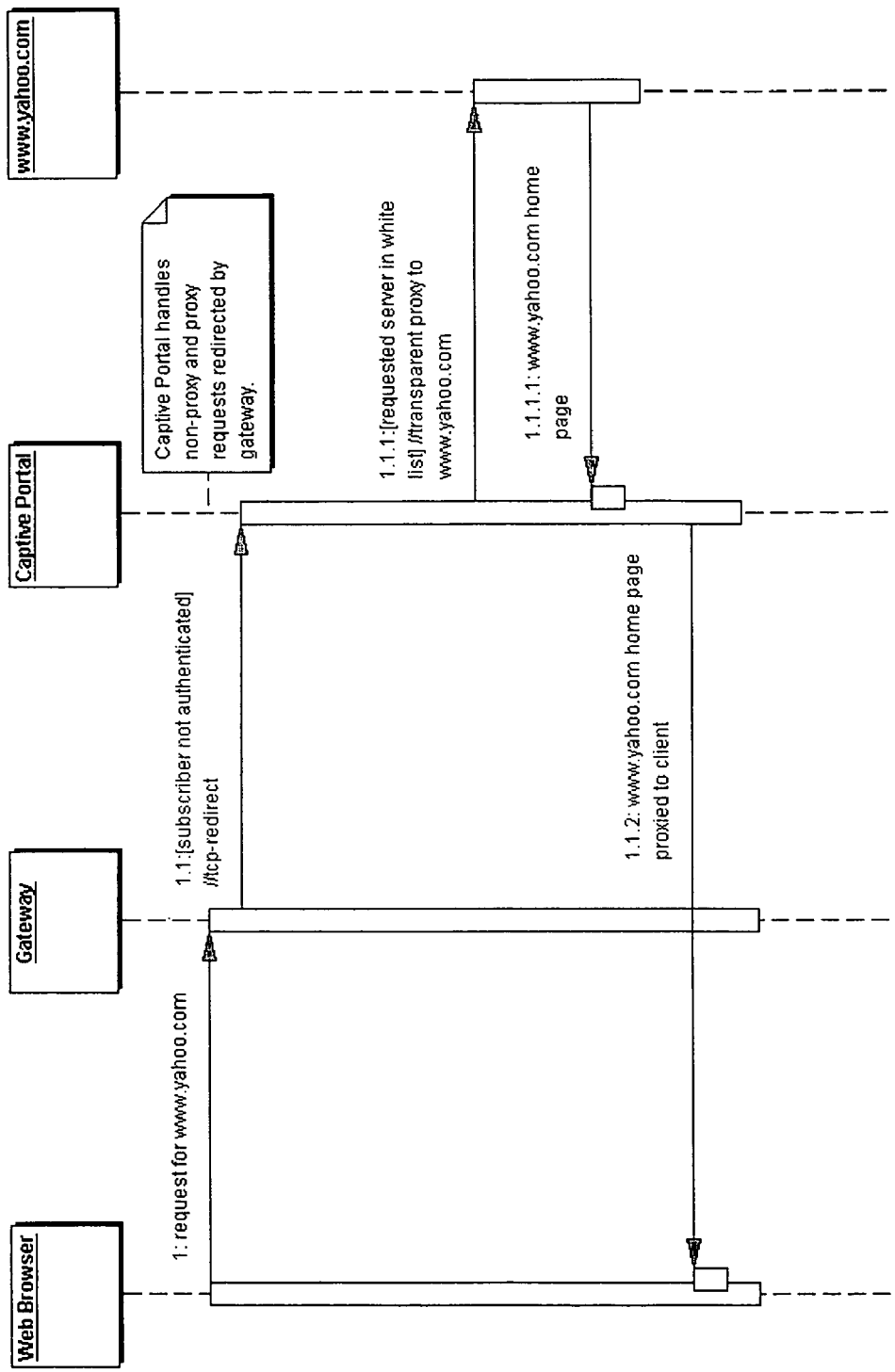
FIG. 3 is a sequence diagram that illustrates the system flow for an unauthenticated users requesting a host that is in the White List.

FIG. 3 is a sequence diagram that illustrates one embodiment of the system flow for a user who is not yet authenticated requesting a host that is in a White List. In the example shown in this diagram, the user can either be a proxy or a non-proxy user.

As shown, when a request from an unauthenticated user is received at the gateway, it is redirected to the Captive Portal. In the embodiment shown in FIG. 3, the Captive Portal handles the request for a host that is in the White List through a transparent proxy. In this manner, all proxy and non-proxy requests for White List hosts can be handled in the same manner. When the requested host is in the White List, the Captive Portal will proxy the request, as shown by arrows 1.1.1.1 and 1.1.2.

Figure 5A:
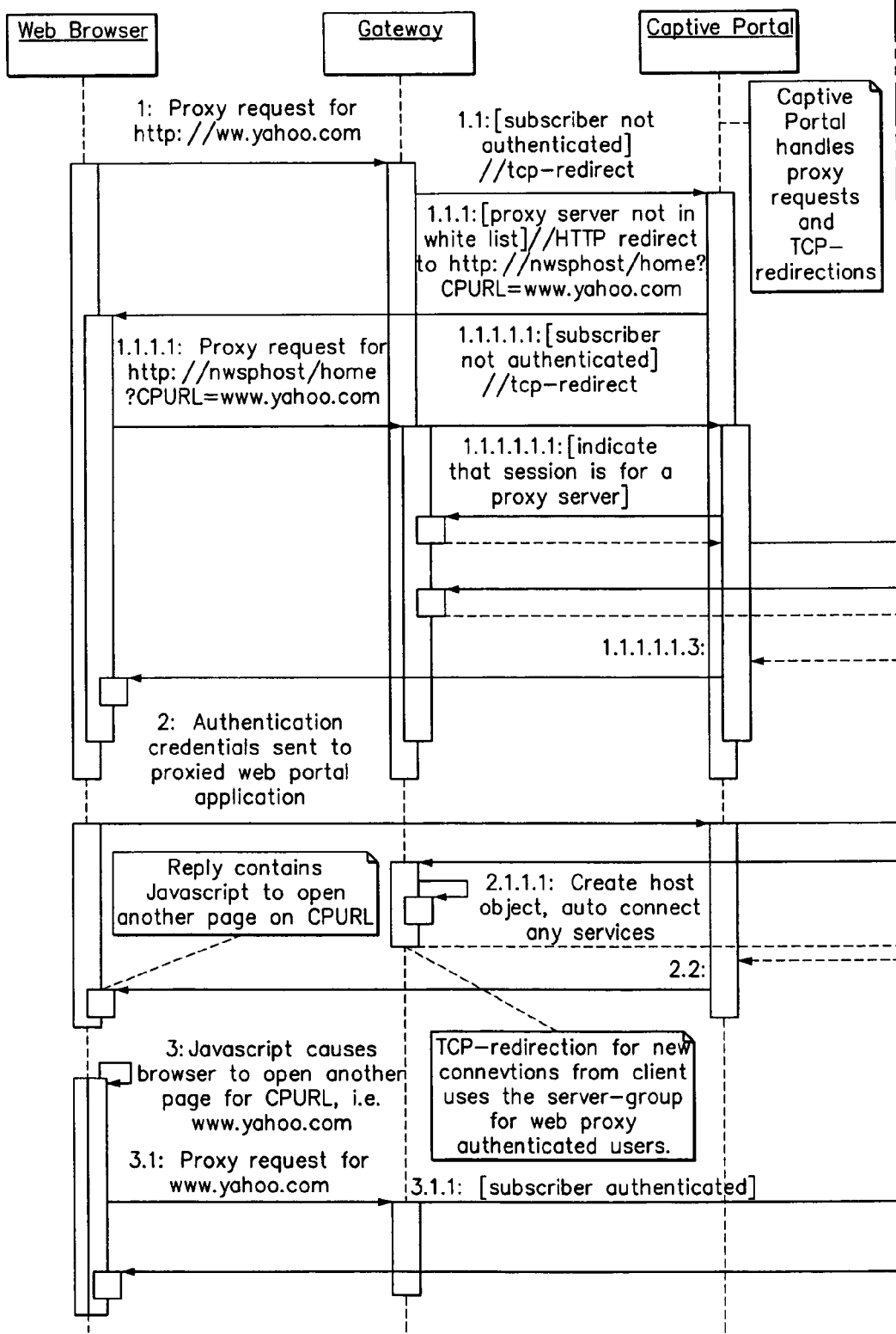

FIGS. 5A and 5B are sequence diagrams that illustrate one embodiment of the system flow for a proxy user who is not yet authenticated requesting a host that is NOT in a White List. As shown at the bottom of FIG. 5B, once the user is authenticated, the requested host (in this example, "www.yahoo.com") is proxied.

3.5 Partial Domain Names in White Lists

In addition to specifying a host using a URL or IP address through exact string matching, one embodiment of the present invention also allows for partial domain names in a White/Black List. In this embodiment, partial string matching is used. For example, a White List may contain '.cisco.com'. In this example, all hosts in the cisco.com domain will be considered to be in the White List.

3.6 White List Groups

In one embodiment of the present invention, a group of hosts can be explicitly defined, and then used in a White or Black List. As a host group name can be explicitly used in the White List definition, it makes the list easier to maintain, as use is clearly visible. Explicit use of a separate list of host groups identifies these clearly.

Table 6 illustrates how a group of hosts named "freeservices" may be defined in a separate MBean attribute.

TABLE 6

```
<Set name="hostGroups">
    <New class="java.util.Hashmap">
        <Put name="freeservices">
            <Array class="java.lang.String">
                <Item>www.multimap.com</Item>
                <Item>www.google.com</Item>
                <Item>192.168.1.1</Item>
            </Array>
        </Put>
    </New>
</Set>
...
```

Table 7 illustrates an example of how the group of hosts named "freeservices" defined in Table 6 can be used in a White List definition in a separate MBean attribute.

TABLE 7

```
<Set name="proxyHostsWhiteLists">
    <New class="java.util.Hashmap">
        ...
        <Put name="paris">
            <Array class="java.lang.String">
                <Item>www.orly.fr</Item>
```

TABLE 7-continued

```
                <Item>freeservices</Item>
            </Array>
        </Put>
    </New>
</Set>
...
```

In an alternative embodiment, a group of hosts may be defined implicitly. In this case the host group and White List are defined in a single MBean attribute.

In one embodiment of the present invention, the ability to define hierarchical locations is provided. In an alternative embodiment, groups of hosts can be defined recursively. In this case, host groups can contain the names of other host groups as well as the names of hosts.

Table 8 illustrates an example of how groups of locations can be defined and used in a White List.

TABLE 8

```
<Set name="locationGroups">
    <New class="java.util.Hashmap">
        <Put name="paris">
            <Array class="java.lang.String">
                <Item>orly</Item>
                <Item>roissy</Item>
            </Array>
        </Put>
    </New>
</Set>
...
<Set name="proxyHostsWhiteLists">
    <New class="java.util.Hashmap">
        ...
        <Put name="paris">
            <Array class="java.lang.String">
                <Item>www.champselysees.fr</Item>
            </Array>
        </Put>
        <Put name="orly">
            <Array class="java.lang.String">
                <Item>www.orly.fr</Item>
            </Array>
        </Put>
    </New>
</Set>
...
```

A reverse lookup may be used to determine what the White Lists are for a location. For the example configuration shown in Table 8, the location 'roissy' is determined as belonging to the location group 'paris', so its White List consists of "www.champselysees.fr". The example in Table 8 also includes a location paris' which has the same White List, i.e. "www.champselysees.fr". Because it additionally has its own definition, the location 'orly' has the White List "www.champselysees.fr" and "www.orly.fr".

By including a location in a location group, the location does not need its own definition in the White Lists. A location may also have a White List even though it does not have a White List definition. For example, in Table 8 'roissy' has a White List of "www.champselysees.fr" through its membership to the location group 'paris'.

As with groups of hosts, locations groups may be defined explicitly in separate MBeans, or implicitly in the same MBean.

4.0 Implementation Mechanisms—Hardware Overview

Figure 4:
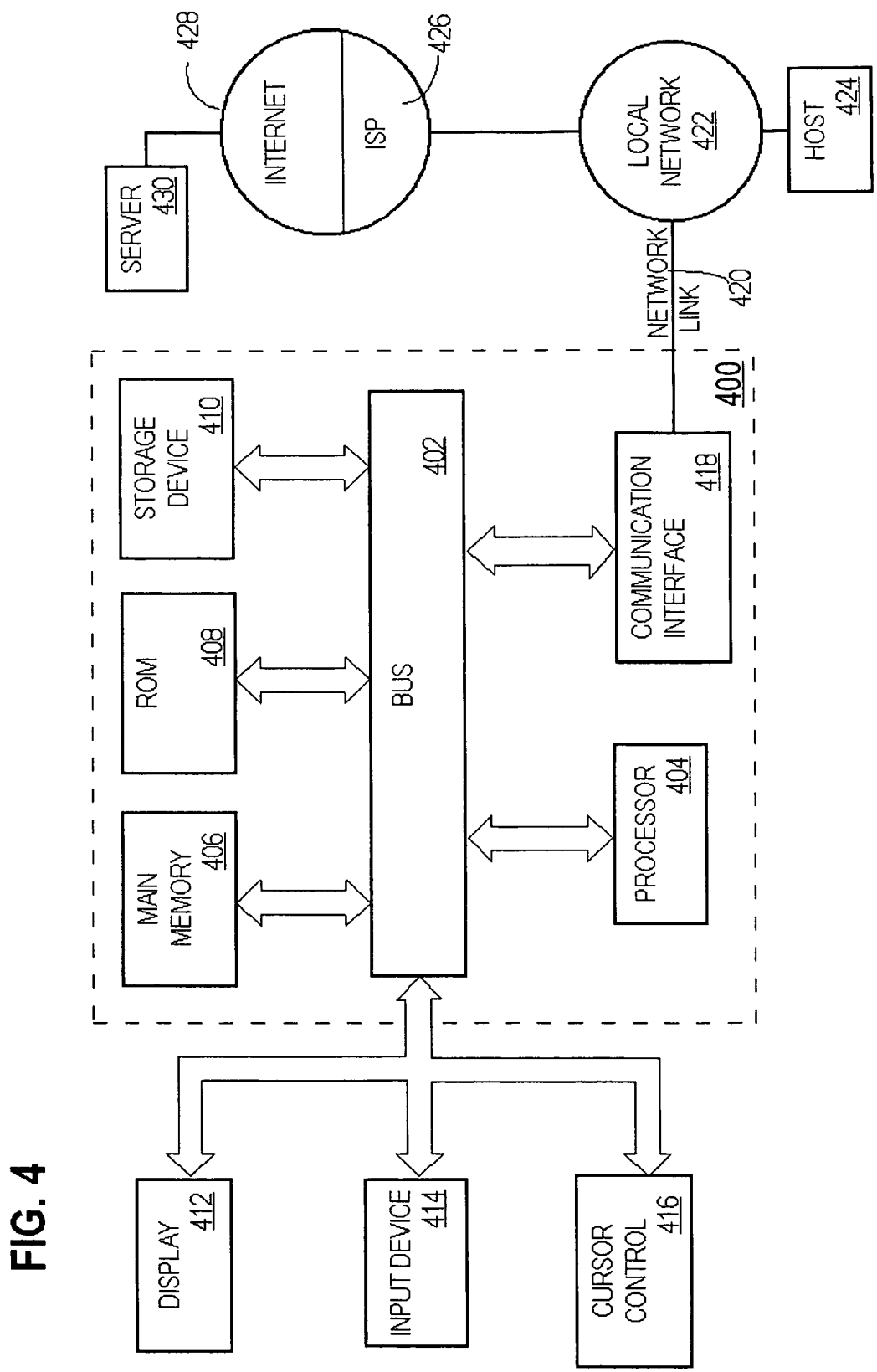
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing location-specific white lists. According to one embodiment of the invention, a location-specific white list is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a location-specific White List service as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing requests from proxy and non-proxy client session connections in a telecommunications network, comprising the steps of:

receiving a request from a client session connection, wherein the request is directed to a first service;

determining whether the request is a proxy request from an authenticated user;

in response to determining that the request is a proxy request from an authenticated user and the authenticated user is authorized to access the first service from a particular access point through which the request was made, redirecting the request to a web proxy server;

in response to determining that the request is a proxy request from the authenticated user and that the authenticated user is not authorized to access the first service from the particular access point through which the request was made, redirecting the request to a transparent proxy port on a captive portal;
in response to determining that the request is not a proxy request from the authenticated user, redirecting the request to the transparent proxy port on the captive portal, wherein authorization comprises determining that a user is permitted to obtain the first service from the particular access point and authentication comprises validating an identity of the user;
wherein said redirecting the request further comprises the steps of:
if the request is directed to a service authorized for unauthenticated users, then the captive portal proxying the request received on the transparent proxy port, and if the request is directed to a service that is not authorized for unauthenticated users, then the captive portal redirecting the request to a web portal; and
wherein the method is performed by one or more computing devices comprising a router.

2. The method of claim 1, wherein the step of determining whether the request is a proxy request from the authenticated user comprises the steps of: determining attributes of the client session connection; and determining whether the request is a proxy request from the authenticated user based on the attributes of the client session connection.

3. The method of claim 1, further comprising the steps of: determining attributes of the client session connection; and determining at least one user-defined location in location definition information associated with the client session connection based on the attributes of the client session connection.

4. The method of claim 3, wherein the location definition information comprises at least one location group definition, said at least one location group comprising at least two defined locations.

5. The method of claim 3, wherein a network management action selected from the group consisting of determining payment methods, determining rate information, setting quality of service parameters, determining whether access is allowed, and selecting a white list, is performed based at least in part on the at least one determined user-defined location.

6. The method of claim 1, wherein the client session connection is originated by the authenticated user at a wireless access point.

7. A computer readable non-transitory storage medium comprising one or more sequences of instructions which, when executed by one or more processors, cause the one or more processors to perform the steps of:
receiving a request from a client session connection, wherein the request is directed to a first service;
determining whether the request is a proxy request from an authenticated user;
in response to determining that the request is a proxy request from the authenticated user and the authenticated user is authorized to access the first service from a particular access point through which the request was made, redirecting the request to a web proxy server;
in response to determining that the request is a proxy request from the authenticated user and that the authenticated user is not authorized to access the first service from the particular access point through which the request was made, redirecting the request to a transparent proxy port on a captive portal;
in response to determining that the request is not a proxy request from an authenticated user, redirecting the request to the transparent proxy port on the captive portal, wherein authorization comprises determining that a user is permitted to obtain the first service from the particular access point and authentication comprises validating an identity of the user; and
wherein the one or more sequences of instructions further comprise instructions which, when executed by one or more processors, cause the one or more processors to perform: if the request is directed to a service authorized for unauthenticated users, then the captive portal proxying the request received on the transparent proxy port, and if the request is directed to a service that is not authorized for unauthenticated users, then the captive portal redirecting the request to a web portal.

8. The medium of claim 7, wherein the one or more sequences of instructions further comprise instructions which, when executed by one or more processors, cause the one or more processors to perform the steps of: determining attributes of the client session connection; and determining whether the request is a proxy request from an authenticated user based on the attributes of the client session connection.

9. The medium of claim 7, wherein the one or more sequences of instructions further comprise instructions which, when executed by one or more processors, cause the one or more processors to perform the steps of: determining attributes of the client session connection; and determining at least one user-defined location in location definition information associated with the client session connection based on the attributes of the client session connection.

10. The medium of claim 9, wherein the location definition information comprises at least one location group definition, said at least one location group comprising at least two defined locations.

11. The medium of claim 9, wherein a network management action selected from the group consisting of determining payment methods, determining rate information, setting quality of service parameters, determining whether access is allowed, and selecting a white list, is performed based at least in part on the at least one determined user-defined location.

12. An apparatus, comprising:
a network interface that is coupled to the data network for receiving one or more packet flows therefrom;
one or more processors;
one or more stored sequences of instructions which, when executed by the one or more processors, cause the one or more processors to carry out the steps of:
receiving a request from a client session connection, wherein the request is directed to a first service;
determining whether the request is a proxy request from an authenticated user;
in response to determining that the request is a proxy request from the authenticated user and the authenticated user is authorized to access the first service from a particular access point through which the request was made, redirecting the request to a web proxy server;
in response to determining that the request is a proxy request from the authenticated user and the authenticated user is not authorized to access the first service from the particular access point through which the request was made, redirecting the request to a transparent proxy port on a captive portal;
in response to determining that the request is not a proxy request from the authenticated user, redirecting the request to the transparent proxy port on the captive portal, wherein authorization comprises determining that a user is permitted to obtain the first service from the particular access point and authentication comprises validating an identity of the user; and wherein the one or more sequences of instructions further comprise instructions which, when executed by one or more processors, cause the one or more processors to perform: if the request is directed to a service authorized for unauthenticated users, then the captive portal proxying the request received on the transparent proxy port, and if the request is directed to a service that is not authorized for unauthenticated users, then the captive portal redirecting the request to a web portal.

13. The apparatus of claim 12, wherein the one or more sequences of instructions further comprise instructions which, when executed by one or more processors, cause the one or more processors to perform the steps of: determining attributes of the client session connection; and
    determining at least one user-defined location in location definition information associated with the client session connection based on the attributes of the client session connection.

14. The apparatus of claim 13, wherein a network management action selected from the group consisting of determining payment methods, determining rate information, setting quality of service parameters, determining whether access is allowed, and selecting a white list, is performed based at least in part on the at least one determined user-defined location.

15. The apparatus of claim 12, wherein the one or more sequences of instructions further comprise instructions which, when executed by one or more processors, cause the one or more processors to perform the steps of:
    determining attributes of the client session connection; and
    determining whether the request is a proxy request from an authenticated user based on the attributes of the client session connection.

16. The apparatus of claim 12, wherein the location definition information comprises at least one location group definition, said at least one location group comprising at least two defined locations.

17. The apparatus of claim 12, wherein the client session connection is originated by the authenticated user at a wireless access point.

* * * * *

UNITED STATES PATENT AND TRADEMARK OFFICE
CERTIFICATE OF CORRECTION

PATENT NO. : 8,127,008 B2  
APPLICATION NO. : 11/110340  
DATED : February 28, 2012  
INVENTOR(S) : Michael Manning et al.

Page 1 of 1

It is certified that error appears in the above-identified patent and that said Letters Patent is hereby corrected as shown below:

Title Page: above Item (51) insert Item --(63) Related U.S. Application Data
Continuation of application no. 10/944,484 filed September 16, 2004.--

Signed and Sealed this
Seventeenth Day of April, 2012

David J. Kappos
*Director of the United States Patent and Trademark Office*